(12) United States Patent
Baxter

(10) Patent No.: US 7,714,270 B2
(45) Date of Patent: May 11, 2010

(54) CONVEX LENSLET ARRAY DIFFUSER

(75) Inventor: Nicholas Baxter, Welwyn Garden City (GB)

(73) Assignee: Xerox Corporation, Norwalk, CT (US)

( * ) Notice: Subject to any disclaimer, the term of this patent is extended or adjusted under 35 U.S.C. 154(b) by 77 days.

(21) Appl. No.: 12/052,049

(22) Filed: Mar. 20, 2008

(65) Prior Publication Data
US 2009/0236497 A1 Sep. 24, 2009

(51) Int. Cl.
*G02B 27/10* (2006.01)
(52) U.S. Cl. .................................. 250/216; 250/221
(58) Field of Classification Search ................ 250/216, 250/208.1; 362/612, 613, 626, 555, 574, 362/507, 538
See application file for complete search history.

(56) References Cited

U.S. PATENT DOCUMENTS

| | | | |
|---|---|---|---|
| 5,200,597 A * | 4/1993 | Eastman et al. | 235/455 |
| 6,338,432 B1 * | 1/2002 | Tawara et al. | 235/462.01 |
| 6,975,949 B2 | 12/2005 | Mestha et al. | |
| 7,077,324 B2 * | 7/2006 | Tien | 235/462.32 |
| 7,427,743 B2 * | 9/2008 | Nuebling | 250/216 |

* cited by examiner

*Primary Examiner*—Georgia Y Epps
*Assistant Examiner*—Tony Ko
(74) *Attorney, Agent, or Firm*—Pillsbury Winthrop Shaw Pittman LLP

(57) ABSTRACT

An illuminator system comprising an illuminator array positioned adjacent to an image bearing surface, the illuminator array comprising a plurality of discrete illuminator elements spaced in a linear arrangement, the illuminating elements each being configured to emit a light beam for transmission to the image bearing surface at an incidence angle; a light diffuser comprising a plurality of rounded lenslets having convex or concave configuration positioned between the illuminator array and the image bearing surface, the rounded lenslets being positioned with respect to the illuminator array to receive the light beams emitted by the illuminator elements and to diffuse the light beams being transmitted to the image bearing surface in the linear direction of the illuminator array; and a linear sensor array comprising a plurality of sensors positioned adjacent to the image bearing surface such that the light beams reflecting off the image bearing surface at a reflectance angle are received by the sensors.

14 Claims, 13 Drawing Sheets

CONVEX LENSLET ARRAY DIFFUSER

FIELD

The present disclosure relates to an illuminator system for reducing the color non-uniformity of a captured image within a scanner.

BACKGROUND

When using an array of LEDs to illuminate a document within a scanner, there are a number of problems to overcome due to the 'point source' nature of LEDs versus the 'continuous source' nature of a fluorescent lamp.

One problem associated with the point source nature of LEDs is the effect of specular reflection, particularly at the document edge. The effect of the specular reflection may also be found in the centerfolds of glossy documents, however, the effect may be prominent at the document edge as the edge curves away from the image bearing surface and the glossy documents reflect light back into the sensor. The effect of specular reflection occurs where a glossy surface directly reflects the light from an illumination source onto an imaging sensor. With a continuous illumination source such as a lamp, this specular reflection may be seen as a white stripe in the cross-process (or fast scan) direction at the edge of the document. However, an array of point illumination sources, such as LEDs, may create a periodic pattern of white marks 200 at the document edge. This periodic pattern of white marks 200 are more objectionable in comparison with the continuous white line from a lamp. FIGS. 1A and 1B show images used to highlight the effect of specular reflection. FIG. 1A shows an image scanned with the continuous source of illumination, such as a lamp, where as FIG. 1B shows an image scanned with the point source of illumination, such as LEDs. The specular reflection can be seen on the left hand side of each image, where the fold in the spine of the document is located.

One solution to reduce the effect of "specular reflection" is proposed and is discussed in detail in U.S. patent application (Ser. No. 12/014,361), incorporated herein by reference. This solution used a different light guide design, such as collimator lenses, to collimate the light from the LED and hence to reduce the effect of "specular reflection".

Another problem associated with point source nature of LEDs is a lack of color uniformity. The solution proposed in U.S. patent application (Ser. No. 12/014,361) does not address or solve the lack of color uniformity. Therefore, the present disclosure provides an illuminator system that employs a specific type of a diffuser to reduce the color non-uniformity of the captured image within a scanner.

SUMMARY

In an embodiment, an illuminator system is provided. The illuminator system includes an illuminator array, a light diffuser and a linear sensor array. The illuminator array is positioned adjacent to an image bearing surface. The illuminator array comprises a plurality of discrete illuminator elements spaced in a linear arrangement. The illuminating elements each are configured to emit a light beam for transmission to the image bearing surface at an incidence angle. The light diffuser comprises a plurality of rounded lenslets having convex or concave configuration positioned between the illuminator array and the image bearing surface. The rounded lenslets are positioned with respect to the illuminator array to receive the light beams emitted by the illuminator elements and to diffuse the light beams being transmitted to the image bearing surface in the linear direction of the illuminator array. The linear sensor array comprising a plurality of sensors positioned adjacent to the image bearing surface such that the light beams reflecting off the image bearing surface at a reflectance angle are received by the sensors.

In another embodiment, a method for reducing the color non-uniformity is provided. The method includes positioning an illuminator array comprising a plurality of discrete illuminator elements spaced in a linear arrangement adjacent to an image bearing surface and configuring the illuminator elements to emit a light beam for transmission to the image bearing surface at an incidence angle; positioning a light diffuser comprising a plurality of rounded lenslets having convex or concave configuration between the illuminator array and the image bearing surface; positioning the plurality of rounded lenslets with respect to the illuminator array to receive the light beams emitted by the illuminator elements and to diffuse the lights beams being transmitted to the image bearing surface in the linear direction of the illuminator array; and positioning a linear sensor array comprising a plurality of sensors adjacent to the image bearing surface, such that the light beams reflecting off the image bearing surface at a reflectance angle are received by the sensors.

Other aspects, features, and advantages will become apparent from the following detailed description, and the accompanying drawings.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

Figure 1A:
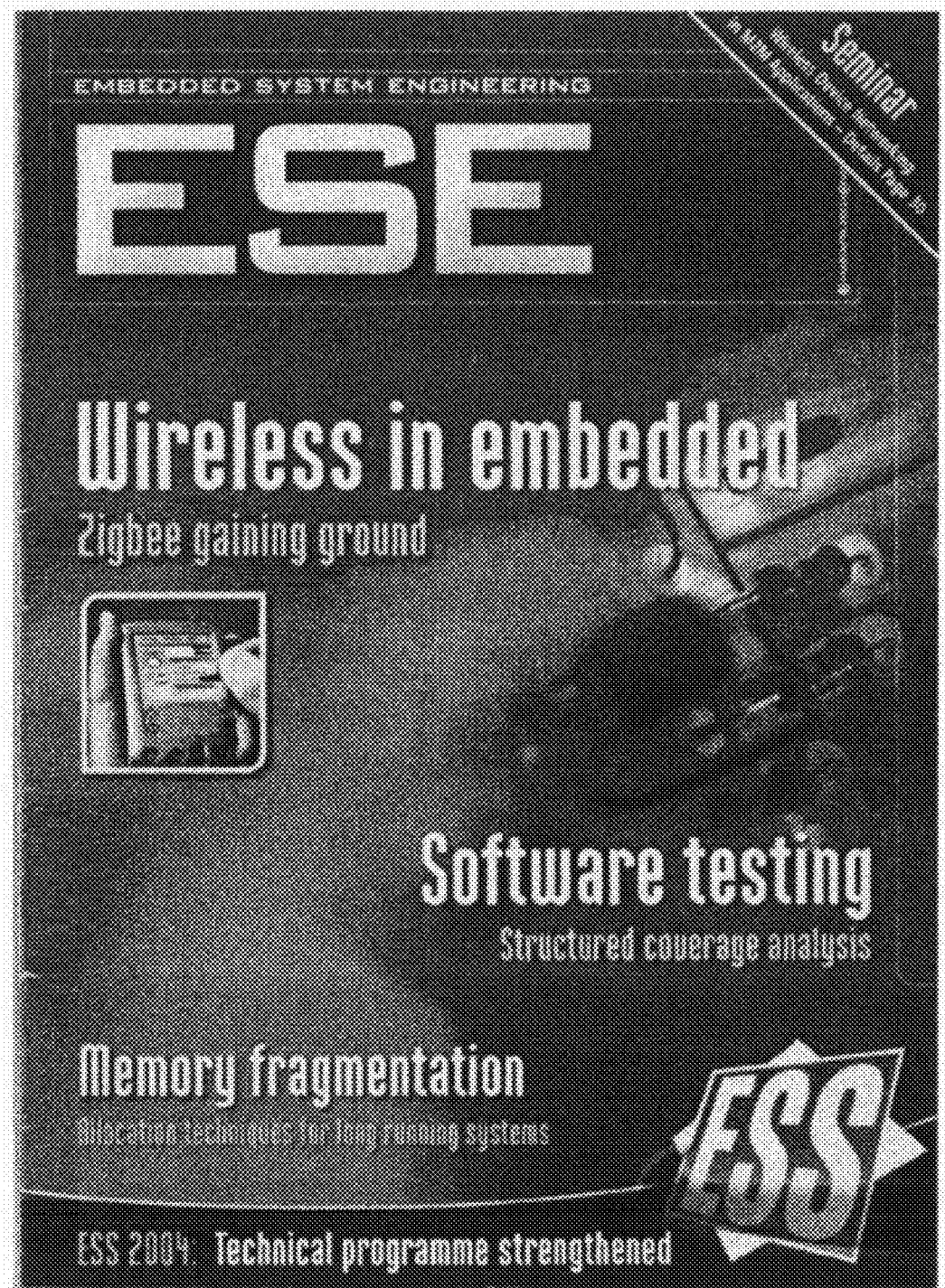
FIG. 1A shows an image that is scanned using a fluorescent lamp.
Figure 1B:
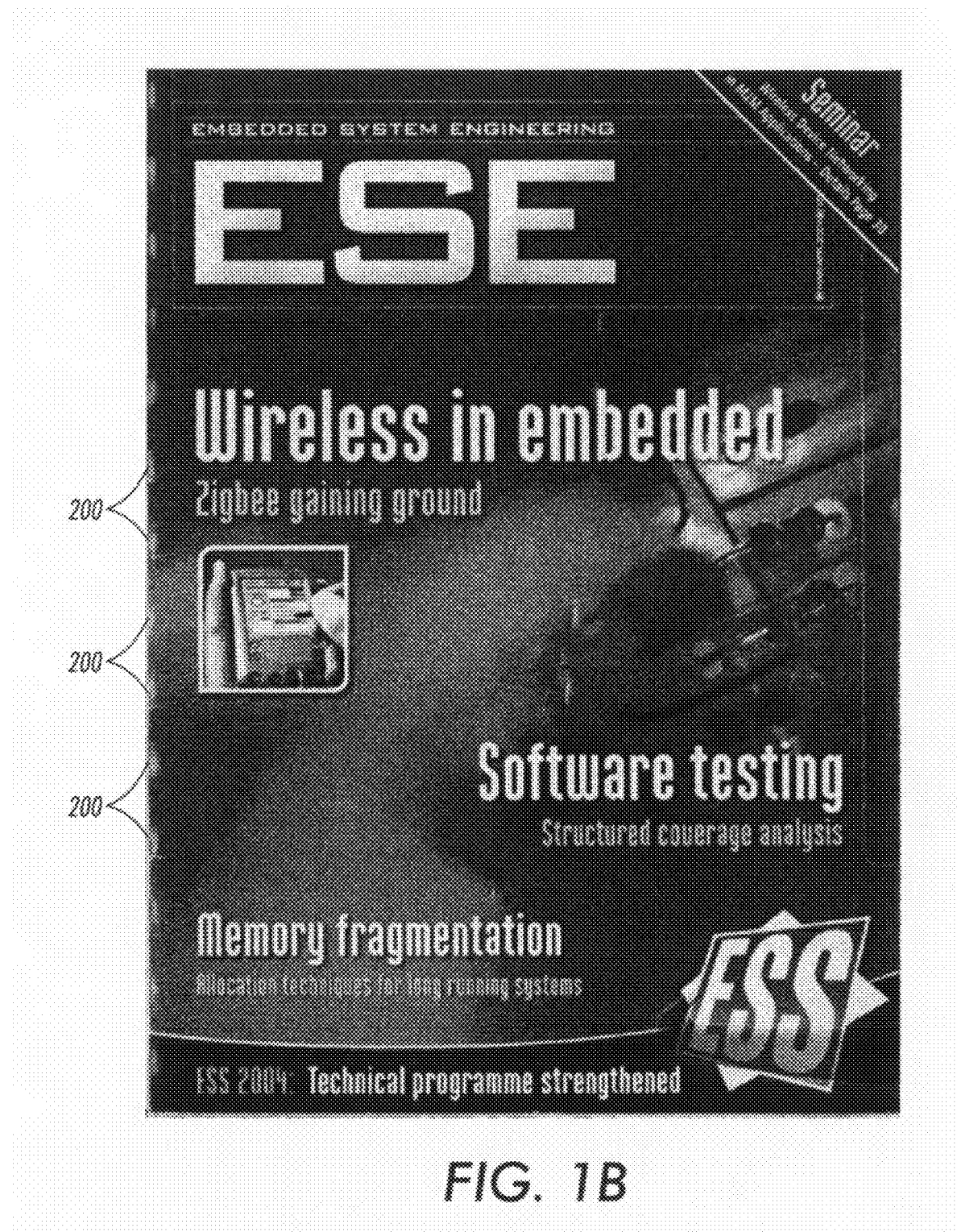
FIG. 1B shows an image that is scanned using an array of LEDs.
Figure 2:
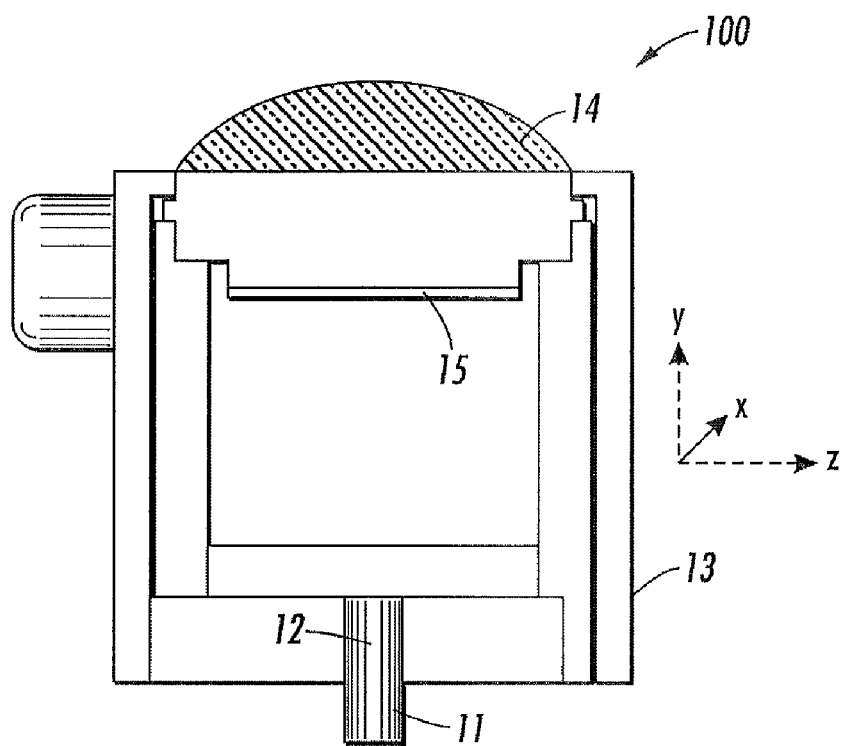
FIG. 2 is a cross-sectional view of an illuminator array along with a diffuser.

The lack of color uniformity on the captured image within a scanner originates from the construction of the LEDs. The construction of LEDs often includes a blue LED die with a yellow phosphor coating. FIG. 2 shows a cross-sectional view of an LED illuminator array along with a diffuser. The LED illumination 100 comprises an LED array 11, a reflector 13, a lens 14, and a diffuser 15. Each LED array 11 includes of a row of LEDs 12, where the LEDs 12 are separated from each other by a distance. In one embodiment, the LEDs 12 are separated from each other by a distance of 10.5 mm. In another embodiment, the LED array 11 may include a row of thirty LEDs. In one embodiment, the LEDs 12 are contained within a housing, which is generally referred to as the reflector 13. In one embodiment, the distance between the surface of the LED 12 to the diffusing surface on lens 14 is approximately 6 mm. The top surface of the lens 14 is convex to collect the light and focus it towards an imaging point in the z-direction. The diffuser 15 is placed in the lower surface of the lens 14 (i.e., between the lens 14 and the LEDs 12) so that the light in the x-direction (into the page) is dispersed. Therefore, by using the diffuser 15, the point illumination of the LEDs 12 appear to be a continuous illumination.

Figure 3:
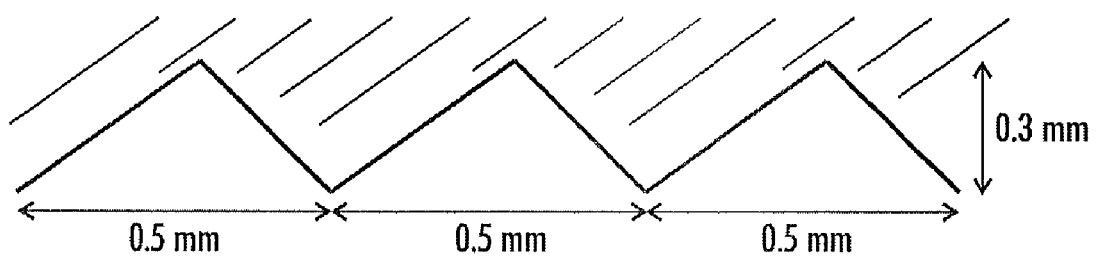
FIG. 3 is a cross-sectional view of a saw tooth pattern diffuser.

Currently, two types of diffuser designs are used in an LED illuminator system, both of them have a saw tooth pattern but have different dimensions. The first saw tooth pattern diffuser has peaks that are separated by 0.03 mm and a peak to trough depth of 0.021 mm, the second saw tooth pattern diffuser has a peak separation of 0.5 mm and a peak to trough depth of 0.3 mm. The cross-section view of the second saw tooth pattern diffuser is shown in FIG. 3. The second saw tooth pattern diffuser has a greater reduction in specular reflection, however, both the first saw tooth pattern diffuser and the second saw tooth pattern diffuser introduced the problem of color non-uniformity.

Figure 4:
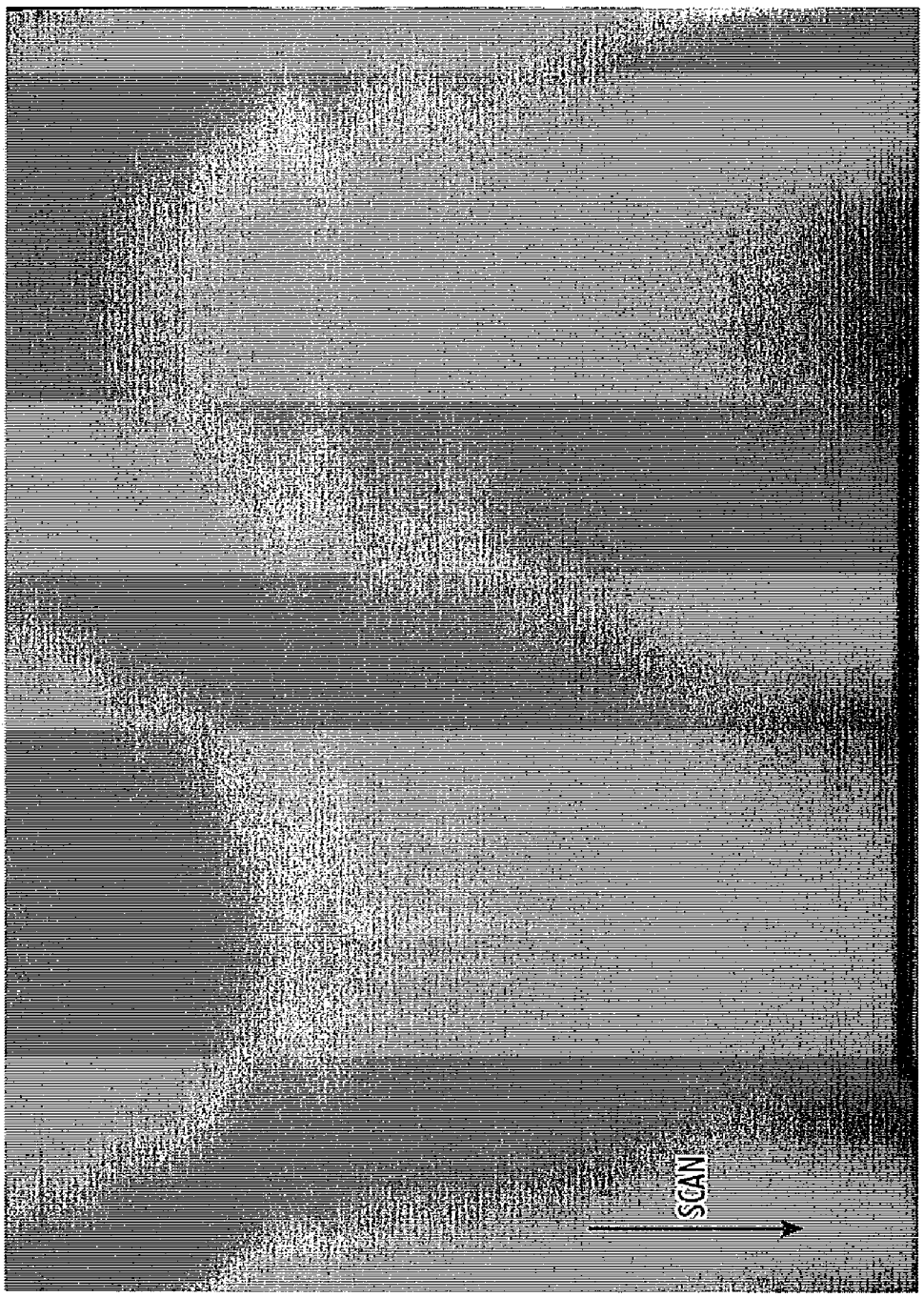
FIG. 4 is a view of an image showing color non-uniformity as visible strips in the process (or slow scan) direction.

The lack of color uniformity on the captured image within the scanner is shown in FIG. 4. The color non-uniformity in the image can be clearly seen as visible stripes in the process (or slow scan) direction. The visible stripes line up with the location of the LEDs 12 on the LED array 11. The effect of color non-uniformity is predominantly visible in the blue channel of the captured image. The red and green channels remain relatively uniform. Also, the color non-uniformity occurs when there is a difference in the height of the target above an image bearing surface relative to the height of the calibration strip. In one embodiment, a target in the form of a uniform white card is placed on the image bearing surface. The target is gradually raised from one end to the other end of the scan. Specifically, the target is configured to rest on the image bearing surface at one end and is raised by a distance at the other end of the scan. In one embodiment, the other end of the target is raised by a distance of 4 mm above the image bearing surface. The raised target configuration aids in evaluating the distribution of light with varying height.

Figure 5:
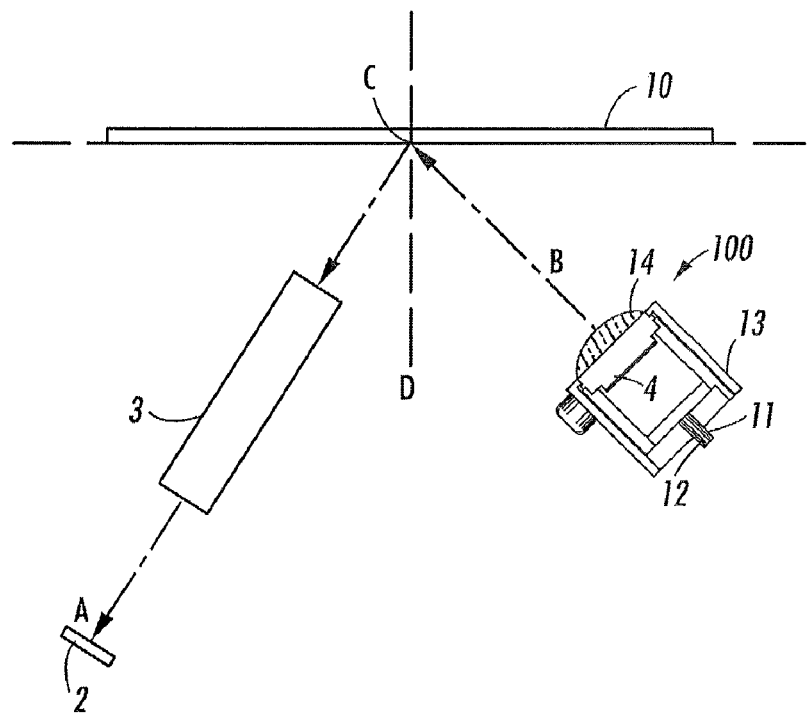
FIG. 5 is a cross-sectional view of the LED illuminator system and an image bearing surface.

FIG. 5 shows the present disclosure with an LED illuminator system using a light diffuser with an array of rounded lenslets each having convex or concave configuration to reduce the color non-uniformity. The illuminator system includes an illuminator array 11, a image bearing surface 10, the light diffuser 4 comprising plurality of rounded lenslets, a lens array 3, and a linear sensor array 2.

The illuminator array 11 with a plurality of discrete illuminator elements, which are spaced in a linear arrangement, is described in detail with respect to FIG. 2. In one embodiment, the linear LED array 11 could also use more than one row of LEDs 2. The combination of a linear array sensor 2 and linear LED array allows for high spatial resolution (e.g., 600 spots per inch) in both the process and cross-process directions. The LED arrays could be all one color, e.g., white or of multiple colors, as described in U.S. Pat. No. 6,975,949, incorporated herein by reference. Other discrete light sources are also contemplated, such as fiber optic light guide tubes. In one embodiment, the image bearing surface 10 is a platen. However, it may also be the printed document, or any other surface bearing an image.

Figure 6:
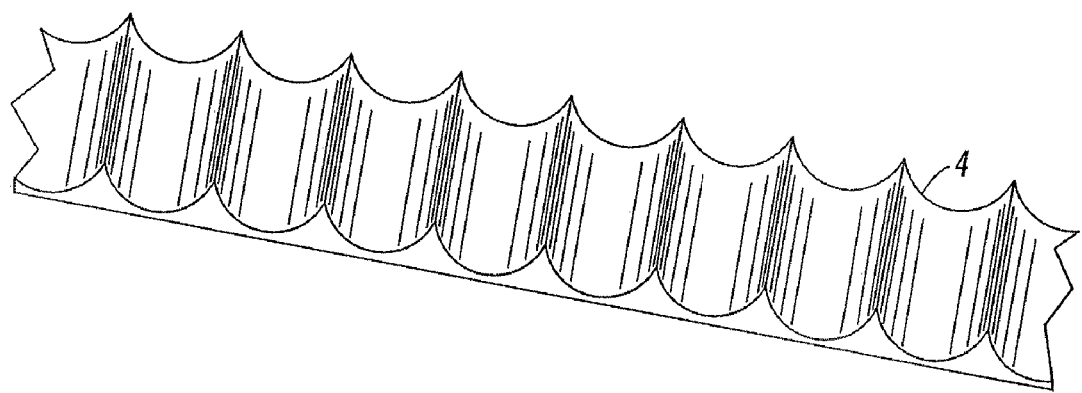
FIG. 6 is a perspective view of a concave lenslets diffuser.
Figure 7:
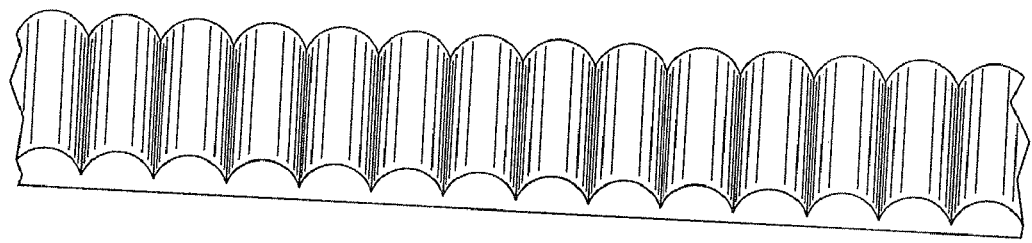
FIG. 7 is a perspective view of a convex lenslets diffuser.

The light diffuser 4 includes plurality of rounded lenslets each having convex or concave configuration (as can be seen in FIGS. 6 and 7). The light diffuser 4 with the plurality of rounded lenslets is positioned between the illuminator array 1 and the image bearing surface 10, and preferably between the lens 14 and the LEDs 12 (and more preferably on the surface of the lens 14, at the same plane as the diffuser 15 in FIG. 2). The rounded lenslets are positioned with respect to the illuminator array 11 to receive the light beams emitted by the illuminated elements of the illuminator array 11. In the illustrated embodiment, the face of the LEDs 12, with the opposite flat surface engaged with the lens 14. The rounded lenslets diffuse the light beams emitted by the illuminated elements of the illuminator array 11 for transmission to the image bearing surface 10 at an incidence angles θ, where the incidence angles θ is less than a predetermined acceptance angle α of the lens array 3. In one embodiment, each rounded lenslets of the light diffuser 4 is a convex lenslets. In another embodiment, each rounded lenslets of the light diffuser 4 is a concave lenslets. The rounded lenslets are made from plastic, glass or any other transparent material as would be appreciated by one skilled in the art. In one embodiment, the lenses may be made from a polycarbonate. Preferably, the lenslet material has a higher refractive index than the medium outside the lens. This medium will typically be air, so almost all transparent materials will have a higher refractive index. However, in the event the surrounding medium is a liquid or vacuum, more specific materials may be used to ensure a higher refractive index.

FIG. 6 shows a concave lenslets diffuser used in one embodiment of the present disclosure. The radius of curvature for the concave lenslets diffuser is 0.25 mm. The peaks separation (i.e., pitch) for the concave lenslets diffuser is 0.5 mm and the total depth from the peaks to the opposite surface of the lenslet diffuser is about 0.3 mm. FIG. 7 shows a convex lenslets diffuser used in another embodiment of the present disclosure. The convex lenslets diffuser shown in FIG. 7 has the same dimensions, i.e., the peaks separation and the peak to trough depth, as the concave lenslets diffuser shown in FIG. 6.

Referring back to FIG. 5, the lens array 3, such as a Selfoc® lens or other microlens arrangement with the predetermined acceptance angle α, may be interposed between the image bearing surface 10 and the linear sensor array 2. A Selfoc® lens is a gradient index lens which consists of fiber rods with parabolic index profile. In one embodiment, the Selfoc® lens has an acceptance angle α of about ±9 degrees. In one embodiment, the lens array 3 is placed in the optical path of the light beams reflecting off the image bearing surface 10 at a reflectance angle.

Preferably, the linear sensor array 2 is, for example, a full width array (FWA) sensor. A full width array sensor is defined as a sensor that extends substantially an entire width (perpendicular to a direction of motion) of the moving image bearing surface. The full width array sensor is configured to detect any desired part of the printed image, while printing real images. The full width array sensor may include a plurality of sensors equally spaced at intervals (e.g., every 1/600th inch (600 spots per inch)) in the cross-process (or fast scan) direction. See for example, U.S. Pat. No. 6,975,949, incorporated herein by reference. It is understood that other linear array sensors may also be used, such as contact image sensors, CMOS array sensors or CCD array sensors.

In one embodiment, a processor (not shown) is configured to process the light beams reflecting off the image bearing surface 10 and detected by the linear sensor array 2. In other embodiment, the processor is provided to both calibrate the sensor and to process the reflectance data detected by the linear sensor array 2. The processor could be dedicated hardware like ASICs or FPGAs, software, or a combination of dedicated hardware and software.

More specifically, as discussed in U.S. Pat. No. 6,975,949, mentioned above, the present invention may be used in an image printing device that includes a print engine for printing an image onto the image bearing surface 10. Further, as discussed in this reference, the processor or processor system coupled to the plurality of sensors is configured for processing data output by the sensors to capture the image from the image bearing surface 10. The processing system is also configured to process the image and calibrate the print engine based on the image.

In one embodiment, a document to be scanned may generally be fixed in position on the image bearing surface 10, and a scanner carriage (not shown) may be configured to move underneath the document to capture the image. In this embodiment, the scanner carriage may include illumination sources, such as lamps, LED illuminators, a lamp along with a reflector or a mirror, or a LED illuminator along with a reflector or a mirror. The illumination sources may be a part of the sensor carriage. The illumination sources may be configured to move along with the sensor carriage. It is also contemplated that the system may include moving mirrors to direct the reflected light from the document to a fixed image sensor.

As shown in FIG. 5, the illuminator array 11 is located on a line B-C and is configured to emit a light beam that passes through the light diffuser 4 having the rounded lenslets. The rounded lenslets of the light diffuser 4 are also located on the line B-C. The light beams from the rounded lenslets of the light diffuser 4 are incident onto the image bearing surface 10 at point C, which is reflected, thereby producing a reflectance in a direction along line C-A. The angle (∠ACD) between line A-C and normal line D-C is substantially different to the angle (∠BCD) between line B-C and normal line D-C, such that the illuminator array 11 is configured to emit a light beam onto the image bearing surface 10 at point C, thereby producing a reflectance from the image bearing surface 10 at a reflectance angle along line A-C. The linear sensor array 2 is positioned adjacent to the image bearing surface 10 and is located along line A-C, such that it captures the light beam reflecting off the image bearing surface 10 at a reflectance angle at point C. The difference in angles ∠ACD and ∠BCD is preferred to minimize the amount of specular reflectance directed to the sensor 2. Line C-D represents a normal line to the surface at a point C of the image bearing surface 10. Point C may actually be a line or region on the surface of the image bearing surface 10.

Figure 8:
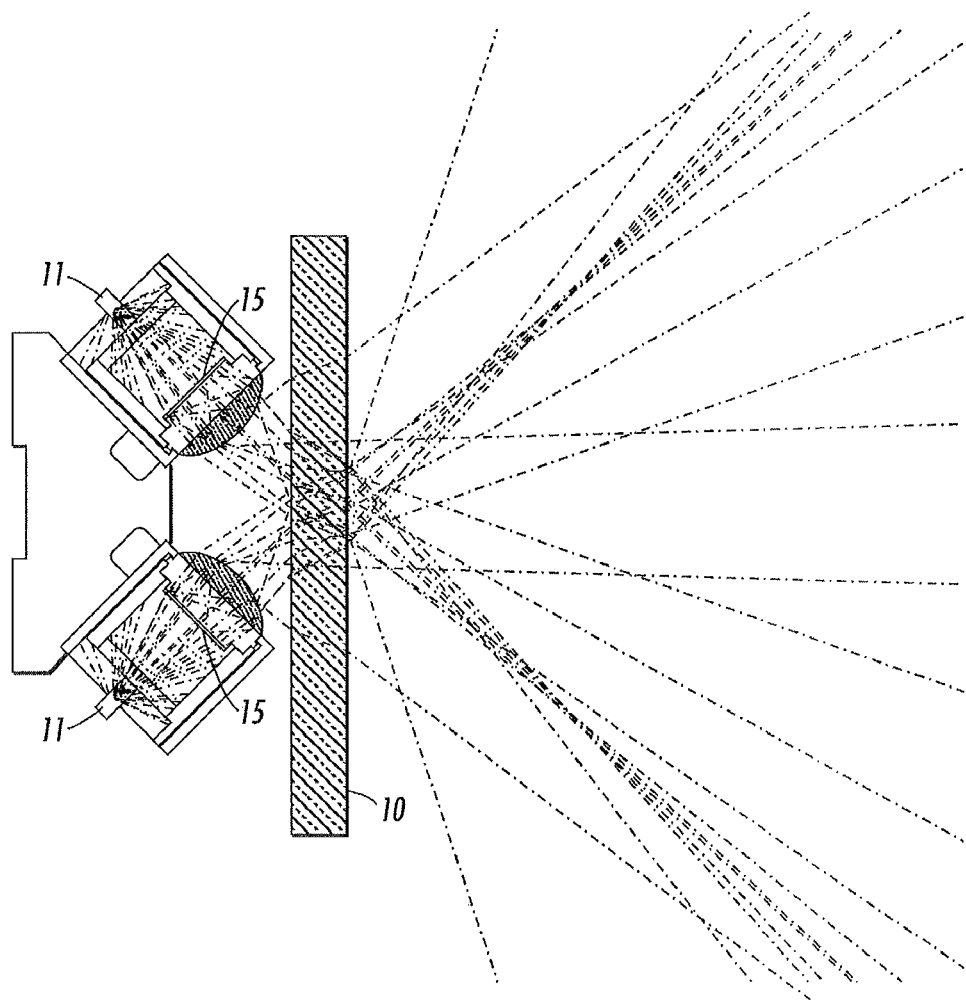
FIG. 8 is a cross-sectional view of the scanner with the LED illuminator system and the image bearing surface.

FIG. 8 is a cross-sectional view of the scanner with the LED illuminator system and the image bearing surface. The scanner includes the illuminator array 11 that is placed at the angle with respect to the image bearing surface 10. In one embodiment, two illuminator arrays 11 are place on opposite sides to illuminate a document in a scanner and to prevent any shadows or highlights on the captured image. In the illustrated embodiment, two illuminator arrays are placed on opposite sides, however, it is contemplated that two lamps, a lamp with a reflector or mirror, or a LED illuminator with a reflector or mirror may be used in place of the two LED illuminator arrays. When using a reflector or a mirror along with the illumination source, the illumination source (e.g., lamp or LED illuminator) may be placed on one side and the reflector or the mirror may be place on the opposite side. A small number of light rays were represented by dashed lines. As shown in FIG. 8, the scanner includes the light diffuser 15 having rounded lenslets with concave or convex configuration described in the present disclosure.

Figure 9:
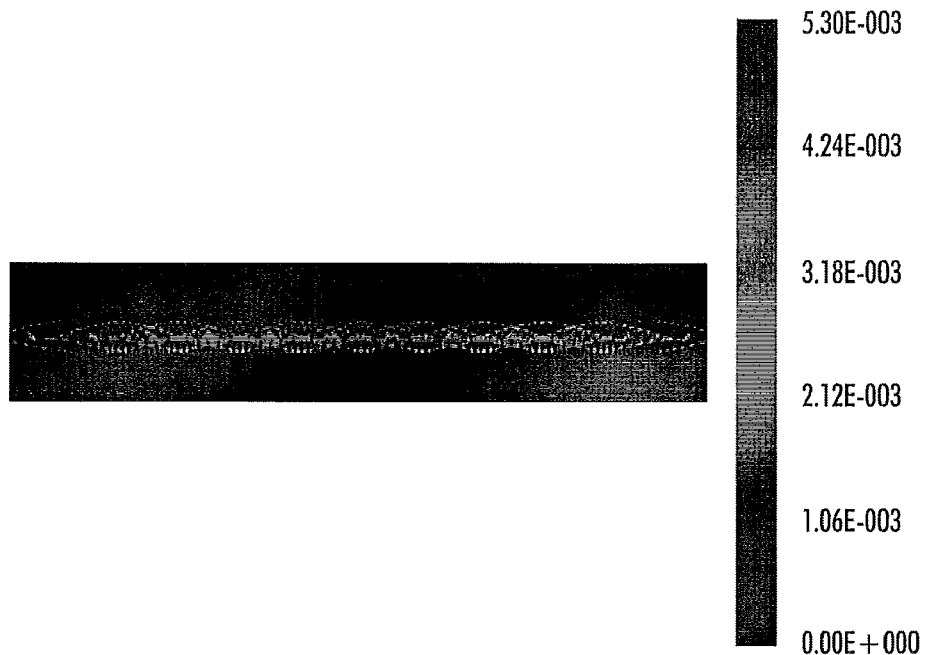
FIG. 9 is a graph showing the light distribution for a saw tooth pattern diffuser.

FIG. 9 shows a graph representing the incident flux for the saw tooth pattern diffuser (shown in FIG. 3). As shown in FIG. 9, several high intensity spots which correspond to the locations of the LEDs are found in the graph, leading to the conclusion that the light is not evenly distributed. The light surrounding the LEDs is also not uniform.

Figure 10:
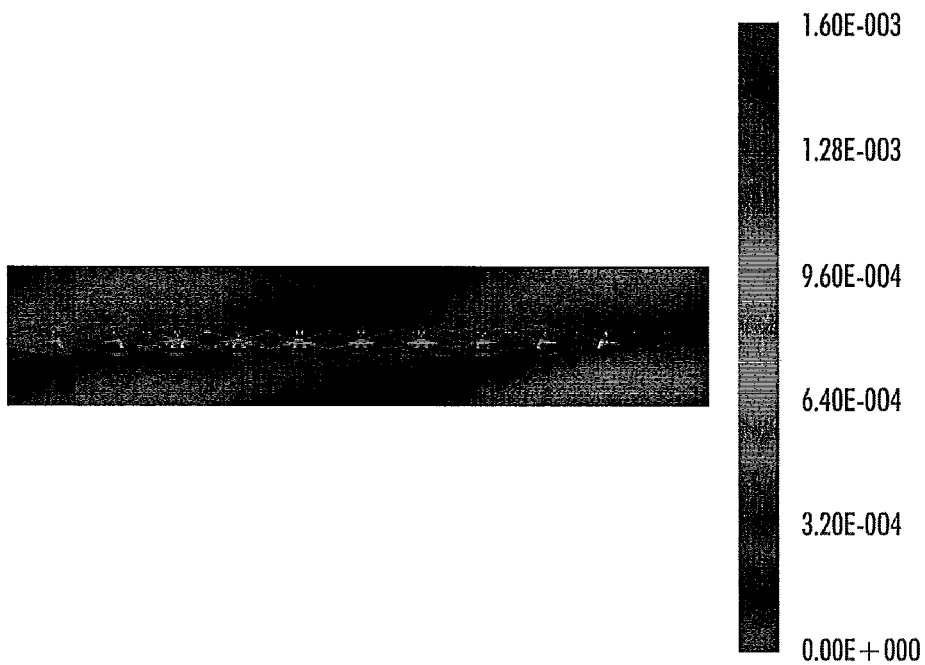
FIG. 10 is a graph showing the light distribution for another saw tooth pattern diffuser.

FIG. 10 shows a contour graph representing the incident flux for another saw tooth pattern diffuser (with the peak separation of 0.03 mm and peak to trough depth of 0.021 mm). A horizontal x-axis and a vertical y-axis represent the position on a detector, which is used to measure the incident flux for the saw tooth pattern diffuser. The colors in the contour graph indicate the intensity of illumination in arbitrary units. As shown in FIG. 10, the difference between the high intensity spots which correspond to the locations of the LEDs and the light surrounding the LEDs is greater in the flux pattern of the this saw tooth pattern diffuser when compared to the flux pattern of the saw tooth pattern diffuser that is shown in FIG. 3.

Figure 11:
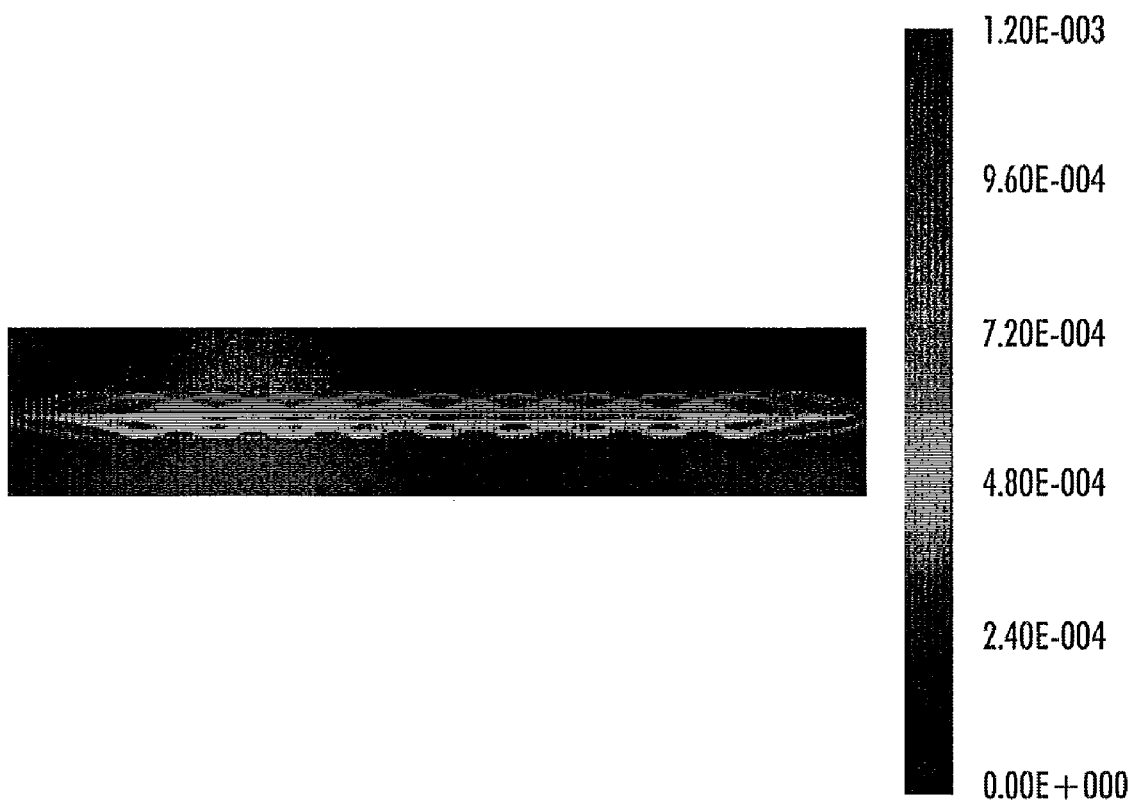
FIG. 11 is a graph showing the light distribution for the concave lenslets diffuser.

FIG. 11 shows a contour graph representing the incident flux for the concave lenslets diffuser. A horizontal x-axis and a vertical y-axis represent the position on a detector, which is used to measure the incident flux for the concave lenslets diffuser. The colors in the contour graph indicate the intensity of illumination in arbitrary units. As can be seen from FIG. 11, the light is more evenly distributed with uniform intensity at the locations that correspond to the locations of the LEDs. The light is also evenly distributed in the areas surrounding the locations that correspond to the locations of the LEDs. In one embodiment, the graphical representation, not shown, of the convex lenslets diffuser produced a light distribution that is same as the concave lenslets diffuser.

Graphs shown in FIGS. 9-11 are generated using computer simulation and are not experimental results.

The variation of the light distribution along any path away from the image bearing surface is analyzed by taking three different cross-sections. The three different cross-sections include (i) a cross-section on the image bearing surface, (ii) a cross-section 0.2 mm above the image bearing surface (approximately at the position of the calibration strip in the scanner) and (iii) a cross-section 0.4 mm above the image bearing surface. Each point analyzed on the 0.2 mm cross-section is normalized to a value of 1, then these normalization factors were applied to the other two cross-sections. Thus forming a simplistic model of the calibration method within the scanner.

Figure 12:
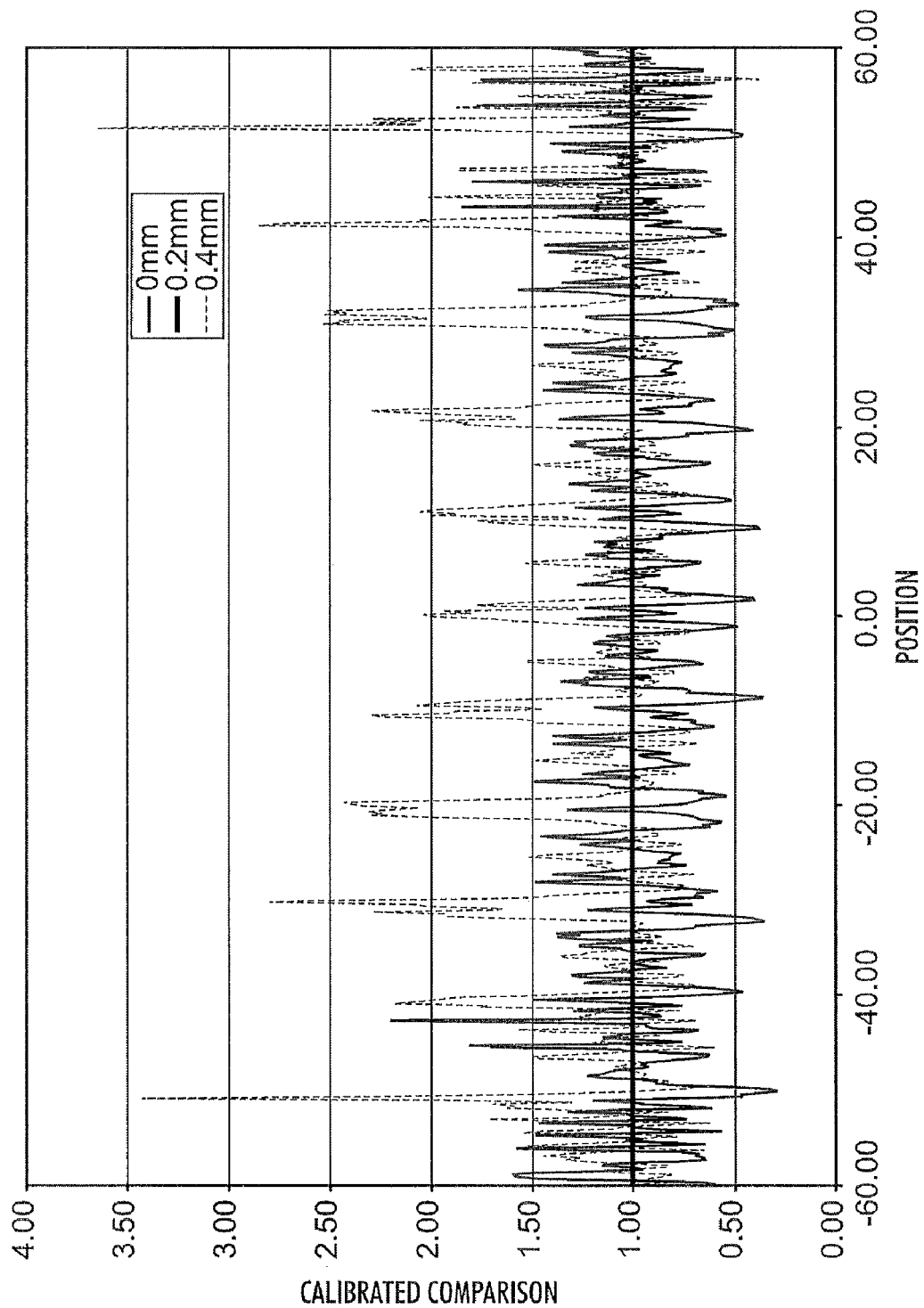
FIG. 12 is a graph showing the results from a calibration process applied to the saw tooth pattern diffuser.

FIG. 12 shows a graph showing the above discussed calibration method applied to the saw tooth pattern diffuser. This graph illustrates the position of the LEDs on a horizontal x-axis. On a vertical y-axis, the graph illustrates normalized calibrated value of the light intensity in arbitrary units. As shown in FIG. 12, even small deviations away from the calibration point induce large variations in the light intensity for the saw tooth pattern diffuser.

Figure 13:
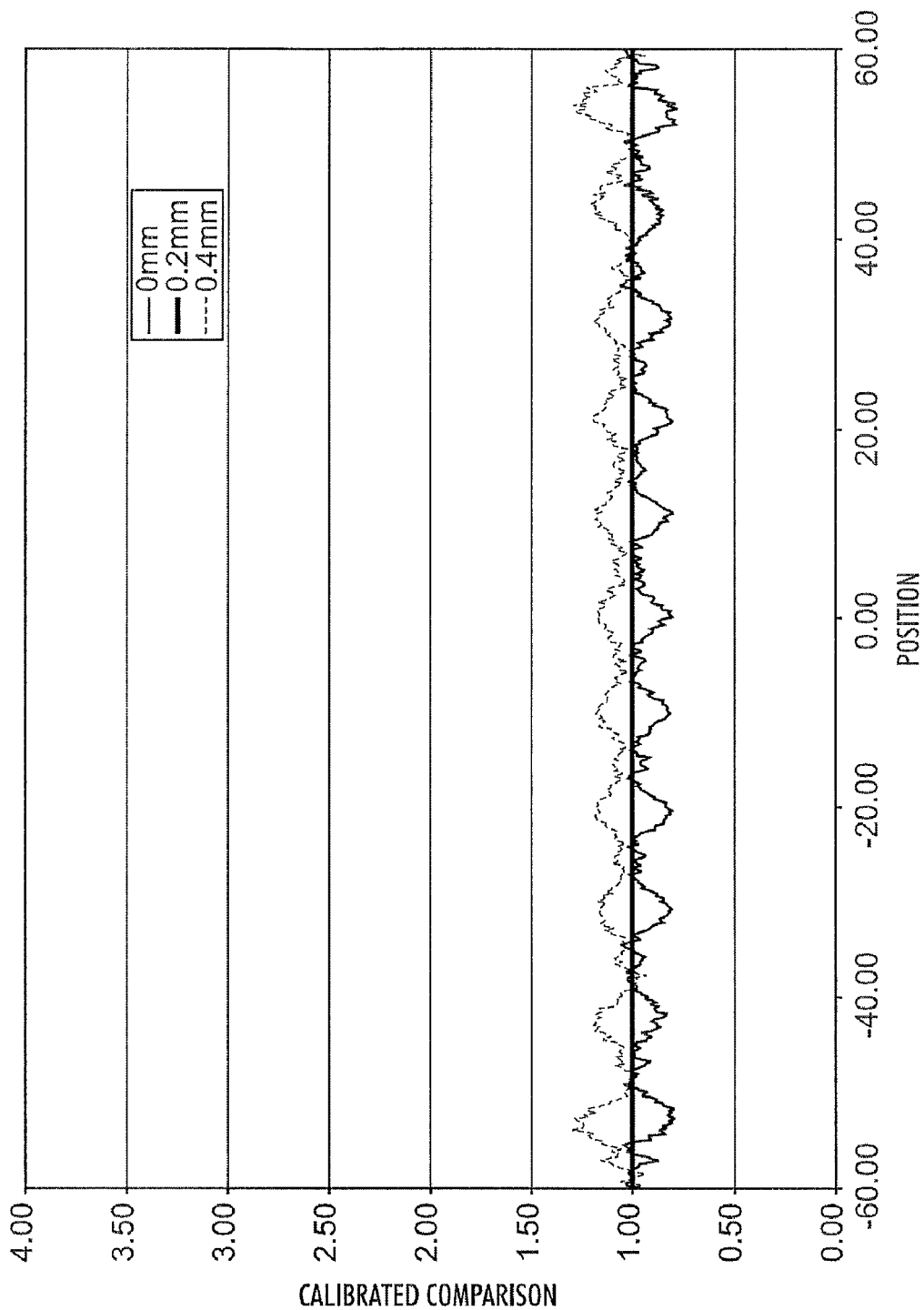
FIG. 13 is a graph showing the results from the calibration process applied to the convex lenslets diffuser.

FIG. 13 shows a graph showing the above discussed calibration method applied to convex style diffuser shown in FIG. 7. This graph illustrates the position of the LEDs on a horizontal x-axis. On a vertical y-axis, the graph illustrates normalized calibrated value of the light intensity in arbitrary units. The scale used in this graph is the same as used in FIG. 12 to allow for a direct comparison, and it is clearly shown in this graph that light is more evenly distributed. The variation in light intensity with the distance away from the image bearing surface is clearly less with the convex style diffuser. The deviations in uniformity away from the calibration point are now much reduced, and the deviations that are left can be mostly explained by the modeling method.

Figure 14:
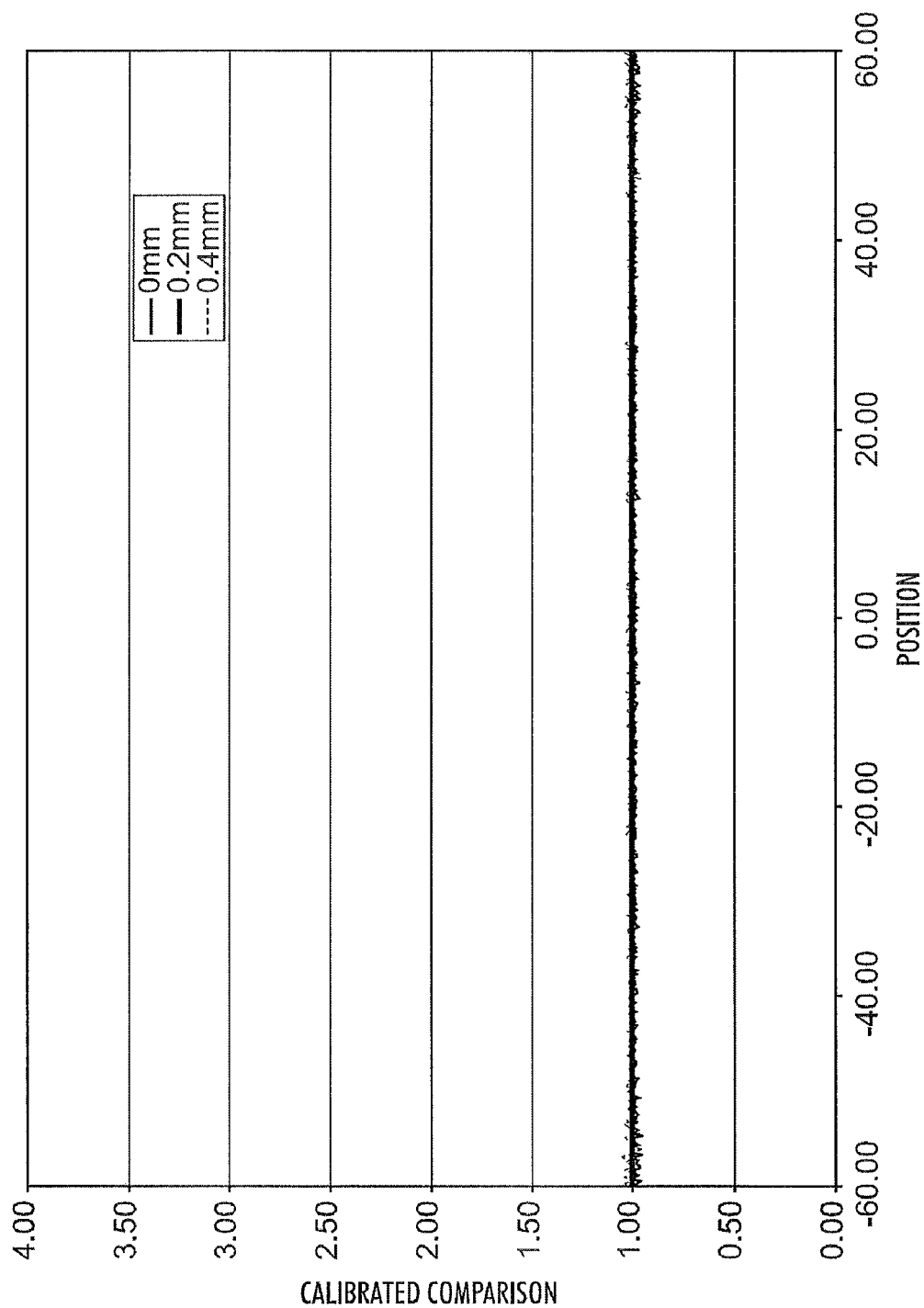
FIG. 14 is a graph showing the results from the calibration process applied to the convex lenslets diffuser as the calibration process follows the center of the light from the LED illuminator array.

FIG. 14 shows a graph that represents the light intensity obtained by applying the calibration method to the rounded lenslets diffuser at the centre of the light from the LED array. This graph shows that the light intensity does not change with distance away from the image bearing surface, and the only variation comes from noise within the experimental model.

Graphs shown in FIGS. 12-14 are generated using computer simulation and are not experimental results.

Figure 15:
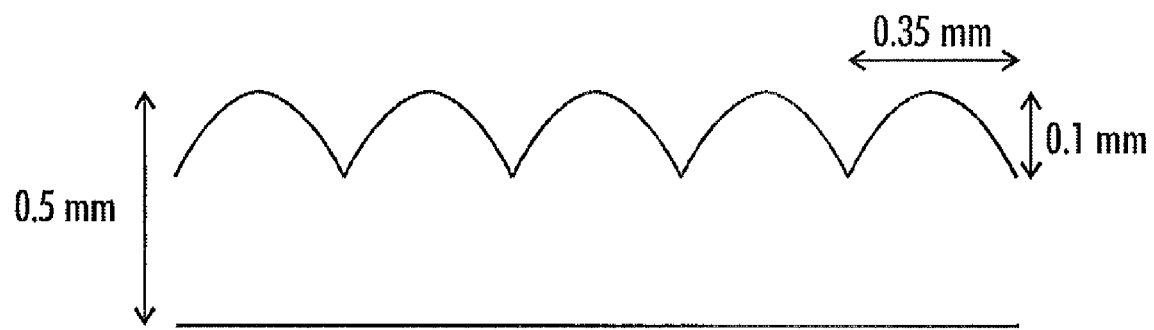
FIG. 15 is cross-sectional view of the convex lenslets diffuser.
Figure 16:
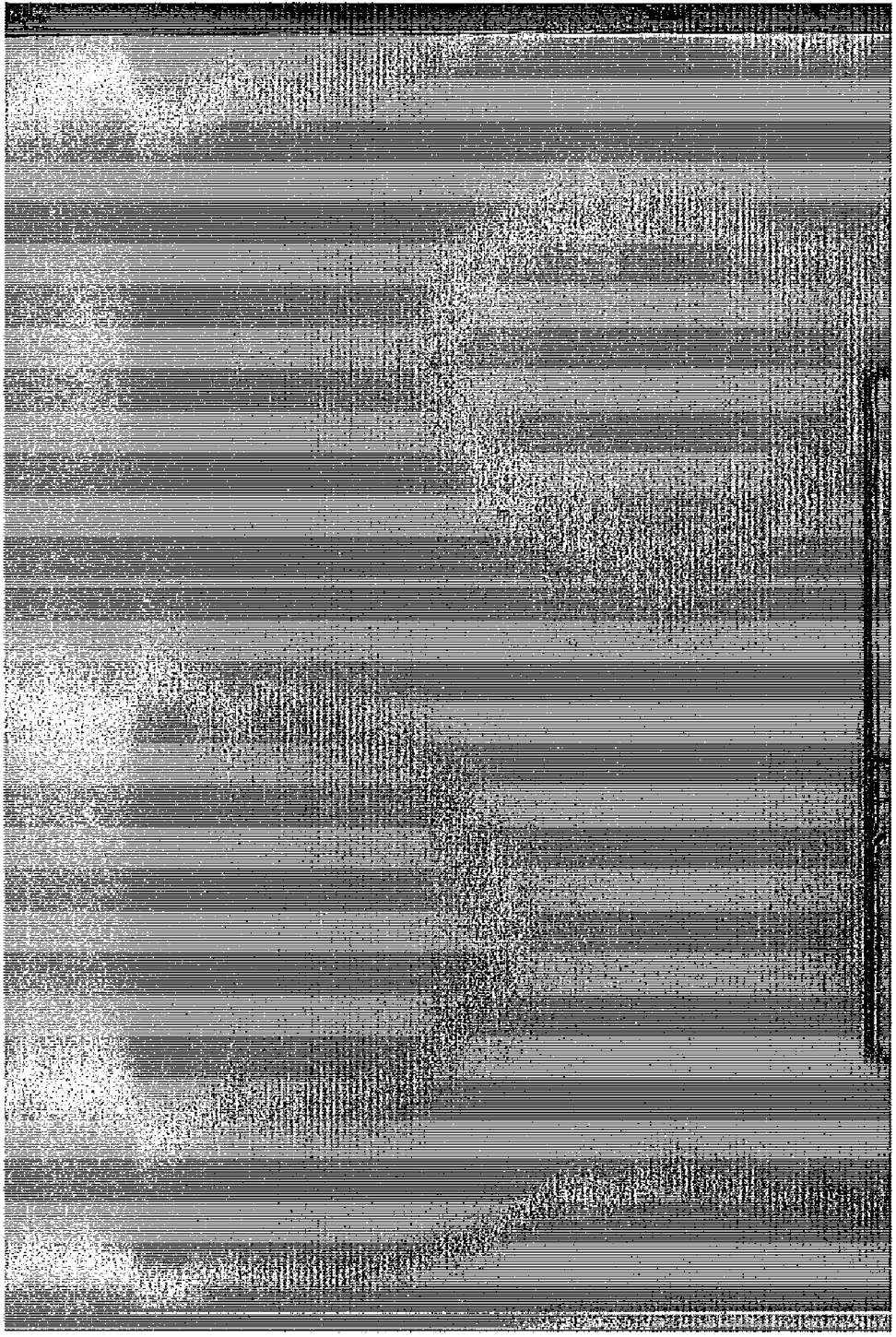
FIG. 16 is a view of an image showing color uniformity in the process (or slow scan) direction.

In one embodiment, the saw-tooth pattern was removed abrasively from the lens of a saw-tooth pattern diffuser, and a material similar in construction to the rounded lenslets diffuser is attached to the underside of the lens. FIG. 15 shows the dimensions of the material used as the rounded lenslets diffuser. The material generally includes a peak separation of 0.35 mm and the peak to trough height of 0.1 mm. FIG. 16 shows an image of the scan of the sloping target obtained using the rounded lenslets diffuser. This image clearly indicates that the color uniformity is improved using the rounded lenslets diffuser.

While the specific embodiments of the present disclosure have been described above, it will be appreciated that the disclosure may be practiced otherwise than described. The description is not intended to limit the disclosure.

I claim:

1. An image printing device, comprising:
   a print engine for printing an image onto an image bearing surface; and
   an illuminating and sensing system comprising:
   i). an illuminator array positioned adjacent to the image bearing surface, the illuminator array comprising a plurality of discrete illuminator elements spaced in a linear arrangement, the illuminating elements each being configured to emit a light beam for transmission to the image bearing surface at an incidence angle;
   ii). a light diffuser comprising a plurality of rounded lenslets having convex or concave configuration positioned between the illuminator array and the image bearing surface, the rounded lenslets being positioned with respect to the illuminator array to receive the light beams emitted by the illuminator elements and to diffuse the light beams being transmitted to the image bearing surface in the linear direction of the illuminator array;
   iii). a linear sensor array comprising a plurality of sensors positioned adjacent to the image bearing surface such that the light beams reflecting off the image bearing surface at a reflectance angle are received by the sensors; and
   iv). a processor system coupled to the plurality of sensors for processing data output by the sensors to capture the image from the image bearing surface, the processor system being configured to process the image and calibrate the print engine based on the image.

2. The image printing device of claim 1, wherein the rounded lenslets is a convex lenslets.

3. The image printing device of claim 1, wherein the rounded lenslets is a concave lenslets.

4. The image printing device of claim 1, wherein the illuminator array comprises a linear LED array, wherein each discrete illuminator comprises an LED.

5. The image printing device of claim 1, further comprising a lens placed in the optical path of the light beams reflecting off the image bearing surface at the reflectance angle.

6. The image printing device of claim 5, wherein the lens is a gradient index lens.

7. The image printing device of claim 1, wherein the linear sensor array is a full width array (FWA) sensor, contact image sensor, a CMOS array sensor or a CCD array sensor.

8. A method for reducing the color non-uniformities in an image captured by a scanning device in a printer for calibrating a print engine, the method comprising:
   emitting light beams at an incidence angle from discrete illuminator elements of an illuminator array comprising a plurality of the discrete illuminator elements spaced in a linear arrangement adjacent to an image bearing surface of the scanning device;
   diffusing the emitted light beams with a plurality of rounded lenslets having convex or concave configuration positioned between the illuminator array and the image bearing surface, the plurality of rounded lenslets being positioned with respect to the illuminator array to receive and diffuse the lights beams being transmitted to the image bearing surface in the linear direction of the illuminator array;
   receiving the light beams reflecting off the image bearing surface at a reflectance angle with a linear array sensor comprising a plurality of sensors adjacent to the image bearing surface;
   processing data output by the plurality of sensors to capture the image; and
   calibrating the print engine based on the image.

9. The method of claim 8, wherein the rounded lenslets is a convex lenslets.

10. The method of claim 8, wherein the rounded lenslets is a concave lenslets.

11. The method of claim 8, wherein the illuminator array comprises a linear LED array, wherein each discrete illuminator comprises an LED.

12. The method of claim 8, further comprising a lens placed in the optical path of the light beams reflecting off the image bearing surface at the reflectance angle.

13. The method of claim 12, wherein the lens is a gradient index lens.

14. The method of claim 8, wherein the linear sensor array is a full width array (FWA) sensor, contact image sensor, a CMOS array sensor or a CCD array sensor.

* * * * *